US008374847B2

(12) United States Patent
Ku et al.

(10) Patent No.: US 8,374,847 B2
(45) Date of Patent: Feb. 12, 2013

(54) ERROR-DETECTING APPARATUS AND METHODS FOR A CHINESE ARTICLE

(75) Inventors: Tsun Ku, Taipei (TW); Shih-Hung Wu, Taipei (TW); Wen-Nan Wang, Taipei (TW); Wen-Tai Hsieh, Taipei (TW); Ta-Hung Hung, Taipei (TW)

(73) Assignee: Institute for Information Industry, Taipei (TW)

( * ) Notice: Subject to any disclaimer, the term of this patent is extended or adjusted under 35 U.S.C. 154(b) by 972 days.

(21) Appl. No.: 12/324,590

(22) Filed: Nov. 26, 2008

(65) Prior Publication Data

US 2010/0063798 A1    Mar. 11, 2010

(30) Foreign Application Priority Data

Sep. 9, 2008 (TW) .............................. 97134531 A

(51) Int. Cl.
*G06F 17/27* (2006.01)
*G06F 17/21* (2006.01)

(52) U.S. Cl. .......................................... 704/9; 715/257
(58) Field of Classification Search ................ 704/1–10; 715/257
See application file for complete search history.

(56) References Cited

U.S. PATENT DOCUMENTS

| | | | | |
|---|---|---|---|---|
| 5,761,687 A * | 6/1998 | Hon et al. | ....... | 715/271 |
| 5,812,863 A * | 9/1998 | Ishikawa | ....... | 715/257 |
| 6,173,252 B1 * | 1/2001 | Qiu et al. | ....... | 704/9 |
| 7,558,725 B2 * | 7/2009 | Greenwald et al. | ....... | 704/1 |
| 7,856,598 B2 * | 12/2010 | Liao et al. | ....... | 715/257 |
| 2006/0271882 A1 * | 11/2006 | Lai et al. | ....... | 715/816 |

FOREIGN PATENT DOCUMENTS

| | | |
|---|---|---|
| CN | 1193779 A | 9/1998 |
| KR | 10-2004-0089774 | 10/2004 |
| TW | 260772 | 10/1995 |

OTHER PUBLICATIONS

Mustafa, "Character Contiguity in N-gram-based Word Matching: The Case for Arabic Text Searching", Information Processing & Management, vol. 41, Issue 4, Jul. 2005, pp. 819-827.*

* cited by examiner

*Primary Examiner* — Samuel G Neway
(74) *Attorney, Agent, or Firm* — Birch, Stewart, Kolasch & Birch, LLP

(57) ABSTRACT

The invention discloses an error-detecting method for a Chinese article, handling a Chinese sentence including a first erroneous Chinese character string in a first location. The method includes subdividing the first erroneous Chinese character string into a plurality of first subgroups, wherein each of the first subgroups consists of two consecutive and non-consecutive Chinese characters out of the first erroneous Chinese character string. The method further includes providing a database containing a plurality of first correct Chinese character strings and a plurality of corresponding first correct indices, wherein the first correct indices consist of two consecutive and non-consecutive Chinese characters out of the first correct Chinese character strings. The method further includes acquiring one of the first correct indices according to the first subgroup, and one of the first correct Chinese character strings according to the acquired first correct index. The method further includes generating a best candidate sentence according to the acquired first correct Chinese character string, and showing the Chinese sentence and the best candidate sentence on a display device.

19 Claims, 5 Drawing Sheets

(A)

| 也 | 因 | 此 | 嚐 | 扁 | 各 | 種 | 酸 | 甜 | 苦 | 臘 |
|---|---|---|---|---|---|---|---|---|---|---|
| 1 | 2 | 3 | 4 | 5 | 6 | 7 | 8 | 9 | 10 | 11 |

Second erroneous Chinese character string — First erroneous Chinese character string (B)

| 也 | 因 | 此 | 嚐 | 扁 | 各 | 種 | 酸 | 甜 | 苦 | 辣 |
|---|---|---|---|---|---|---|---|---|---|---|
| 1 | 2 | 3 | 4 | 5 | 6 | 7 | 8 | 9 | 10 | 11 |

Second erroneous Chinese character string — First candidate term (C)

| 也 | 因 | 此 | 嚐 | 遍 | 各 | 種 | 酸 | 甜 | 苦 | 臘 |
|---|---|---|---|---|---|---|---|---|---|---|
| 1 | 2 | 3 | 4 | 5 | 6 | 7 | 8 | 9 | 10 | 11 |

Second candidate term — First erroneous Chinese character string (D)

| 也 | 因 | 此 | 嚐 | 遍 | 各 | 種 | 酸 | 甜 | 苦 | 辣 |
|---|---|---|---|---|---|---|---|---|---|---|
| 1 | 2 | 3 | 4 | 5 | 6 | 7 | 8 | 9 | 10 | 11 |

Second candidate term — First candidate term

FIG. 4

ERROR-DETECTING APPARATUS AND METHODS FOR A CHINESE ARTICLE

CROSS REFERENCE TO RELATED APPLICATIONS

This Application claims priority of Taiwan Patent Application No, 097134531, filed on Sep. 9, 2008, the entirety of which is incorporated by reference herein.

BACKGROUND OF THE INVENTION

1. Field of the Invention

The invention relates generally to an error-detecting apparatus for Chinese articles, and more particularly, to an error-detecting apparatus that introduces the bi-gram mechanism.

2. Description of the Related Art

In light of increasing computer use, more and more people use computers to write Chinese articles instead of handwriting. However, because of the characteristics of the Chinese language, there are many Chinese characters with the same pronunciation or similar appearance. This makes the Chinese language complicated, and therefore users can easily end up using a wrong Chinese character that just looks similar (or is pronounced identically) to a correct one.

BRIEF SUMMARY OF THE INVENTION

In light of the previously described problems, the objective of the invention is to provide an error-detecting apparatus and method for Chinese articles. With the apparatus and method, the problems faced in the prior art can be solved.

The invention discloses an error-detecting method for a Chinese article, which is applicable for handling a Chinese sentence comprising a first erroneous Chinese character string in a first location. The method comprises subdividing the first erroneous Chinese character string into a plurality of first subgroups, wherein each of the first subgroups consists of two consecutive and non-consecutive Chinese characters out of the first erroneous Chinese character string. The method further comprises providing a database comprising a plurality of first correct Chinese character strings and a plurality of corresponding first correct indices, wherein the first correct indices consist of two consecutive and non-consecutive Chinese characters out of the first correct Chinese character strings. The method further comprises acquiring one of the first correct indices according to the first subgroups, and one of the first correct Chinese character strings according to the acquired first correct index. The method further comprises generating a best candidate sentence according to the acquired first correct Chinese character string, and showing the Chinese sentence and the best candidate sentence on a display device.

Furthermore, the invention discloses an error-detecting apparatus for a Chinese article, which is applicable for handling a Chinese sentence comprising a first erroneous Chinese character string in a first location. The apparatus comprises an article-dividing module, a database, a candidate term generation module, a candidate sentence generating and scoring module and a display device. The article-dividing module subdivides the first erroneous Chinese character string into a plurality of first subgroups, wherein each of the first subgroups consists of two consecutive and non-consecutive Chinese characters out of the first erroneous Chinese character string. The database comprises a plurality of first correct Chinese character strings and a plurality of corresponding first correct indices, wherein the first correct indices consist of two consecutive and non-consecutive Chinese characters out of the first correct Chinese character strings. The candidate term generation module acquires one of the first correct indices according to the first subgroups, and one of the first correct Chinese character strings according to the acquired first correct index. The candidate sentence generating and scoring module generates a best candidate sentence according to the acquired first correct Chinese character string, and the display device shows the Chinese sentence and the best candidate sentence.

Furthermore, the invention discloses a storage medium for storing an error-detecting program for a Chinese article. The error-detecting program comprises a plurality of program codes to be loaded onto a computer system so that an error-detecting method for the Chinese article is executed by the computer system. The error-detecting method is applicable for handling a Chinese sentence comprising a first erroneous Chinese character string in a first location. The error-detecting method comprises subdividing the first erroneous Chinese character string into a plurality of first subgroups, wherein each of the first subgroups consists of two consecutive and non-consecutive Chinese characters out of the first erroneous Chinese character string. The error-detecting method further comprises storing a plurality of first correct Chinese character strings and a plurality of corresponding first correct indices, wherein the first correct indices consist of two consecutive and non-consecutive Chinese characters out of the first correct Chinese character strings. The error-detecting method further comprises acquiring one of the first correct indices according to the first subgroups, and one of the first correct Chinese character strings according to the acquired first correct index. The error-detecting method further comprises generating a best candidate sentence according to the acquired first correct Chinese character string, and showing the Chinese sentence and the best candidate sentence.

BRIEF DESCRIPTION OF THE DRAWINGS

The invention can be more fully understood by reading the subsequent detailed description and examples with references made to the accompanying drawings, wherein:

FIG. 4 depicts all possible candidate sentence combinations for a Chinese sentence Str.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
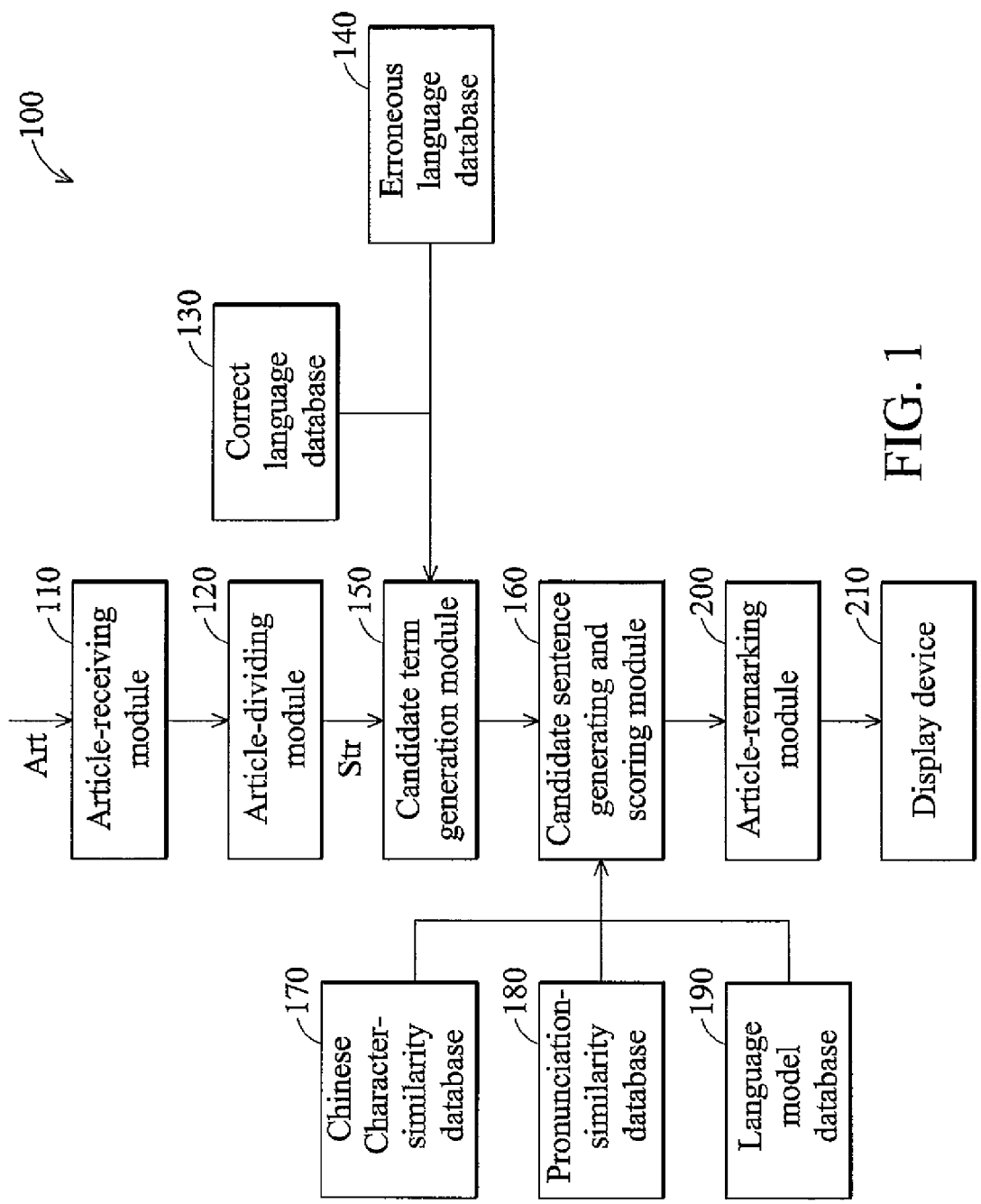
FIG. 1 depicts a diagram of an embodiment of an error-detecting apparatus 100 for a Chinese article according to the invention.

FIG. 1 depicts a diagram of an embodiment of an error-detecting apparatus 100 for a Chinese article according to the invention. The error-detecting apparatus 100 comprises an article-receiving module 110, an article-dividing module 120, a correct language database 130, an erroneous language database 140, a candidate term generation module 150, a candidate sentence generating and scoring module 160, a character-similarity database 170, a pronunciation-similarity database 180, a language model database 190, an article-remarking module 200 and a display device 210.

The article-receiving module 110 is responsible for receiving a Chinese article Art and sends the Chinese article Art to the article-dividing module 120 for a further dividing procedure. The correct language database 130 is used to pre-store the correct phraseology such as idioms, slangs, dialects, proper nouns and poetry (only as an example), and comprises a plurality of first correct Chinese character strings and a plurality of corresponding first correct indices. The erroneous language database 140 is used to pre-store the wrong phraseology that users often misuse and their corresponding correct phraseology. Similarly, the erroneous language database 140 comprises a plurality of second erroneous indices and a plurality of corresponding second correct Chinese character strings. The candidate term generation module 150 is used to acquire the proper first and second correct Chinese character strings and respectively sets the acquired first and second correct Chinese character strings as first and second candidate terms. The candidate sentence generating and scoring module 160 is used to generate a plurality of candidate sentences according to the first and second candidate terms. Furthermore, the candidate sentence generating and scoring module 160 also generates a best candidate sentence by scoring the candidate sentences using a candidate-sentence scoring mechanism based on the data stored in the character-similarity database 170, the pronunciation-similarity database 180 and the language model database 190. Finally, the article-remarking module 200 remarks the Chinese article Art and the best candidate sentence on the display device 210.

What has been described above is a brief introduction of the error-detecting apparatus 100, and the functional description of the components thereof will be described in detail below.

Figure 2:
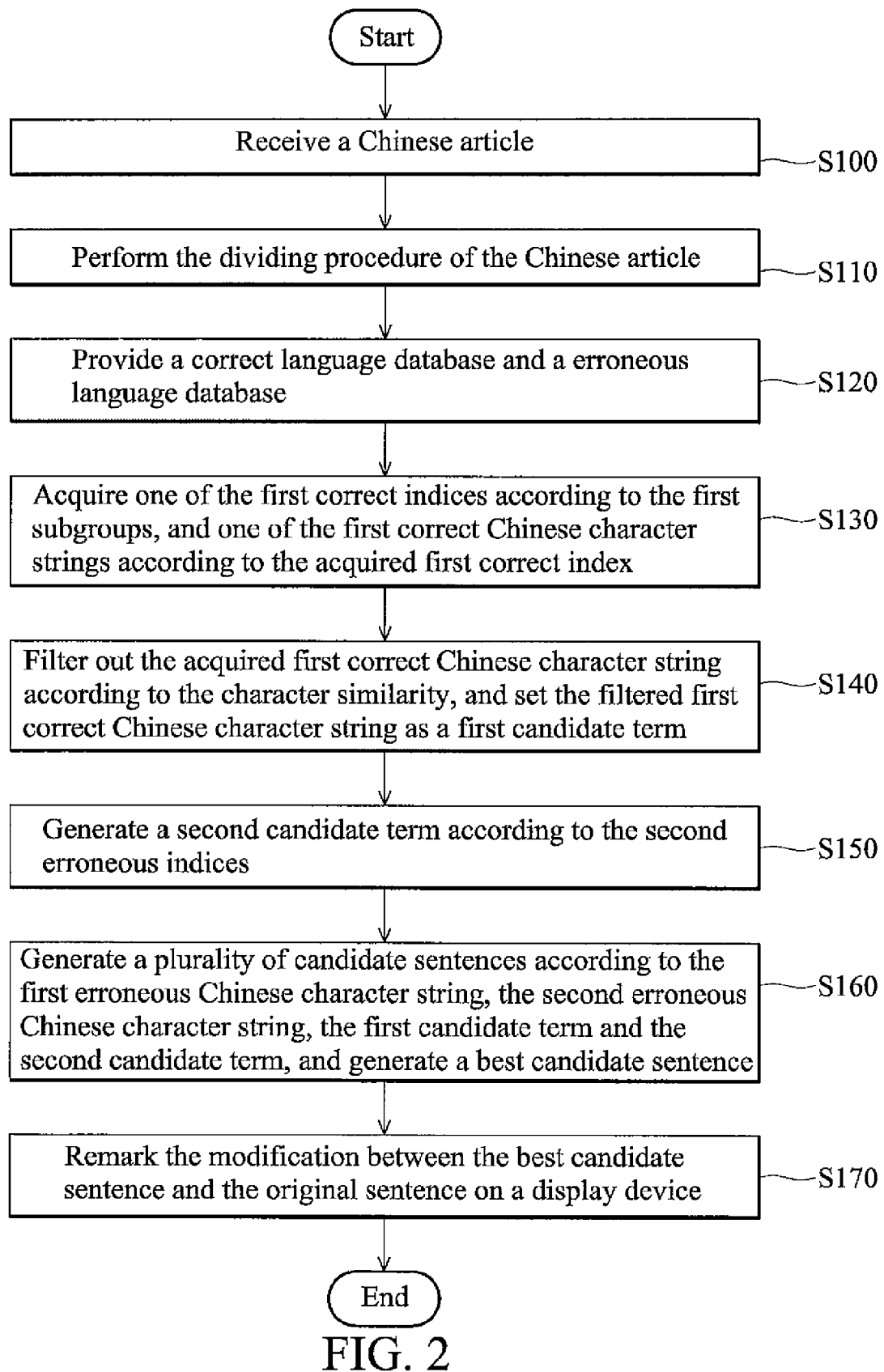
FIG. 2 depicts a flowchart of an embodiment of an error-detecting apparatus 100 for a Chinese article according to the invention.

FIG. 2 depicts a flowchart of an embodiment of an error-detecting apparatus 100 for a Chinese article according to the invention. In step S100, the article-receiving module 110 receives the Chinese article Art. In step S110, the article-dividing module 120 processes the dividing procedure of the Chinese article Art. First of all, the article-dividing module 120 subdivides the Chinese article Art into a plurality of Chinese sentences according to the punctuation marks. For example, consider the Chinese article Art given as follows: "外面的世界 外面的世界 充滿旗幟，令他忍不住 也因此嚐扁各 種酸甜苦臘。". In this example, the article-dividing module 120 subdivides the Chinese article Art into the following three Chinese sentences: 充滿旗幟"、令他忍不住 躍躍浴室" and "也因此嚐扁各 種酸甜苦臘", according to the punctuation marks (commas and periods). After the dividing procedure is done, the dividing procedure for an individual Chinese sentence is performed.

Figure 3:
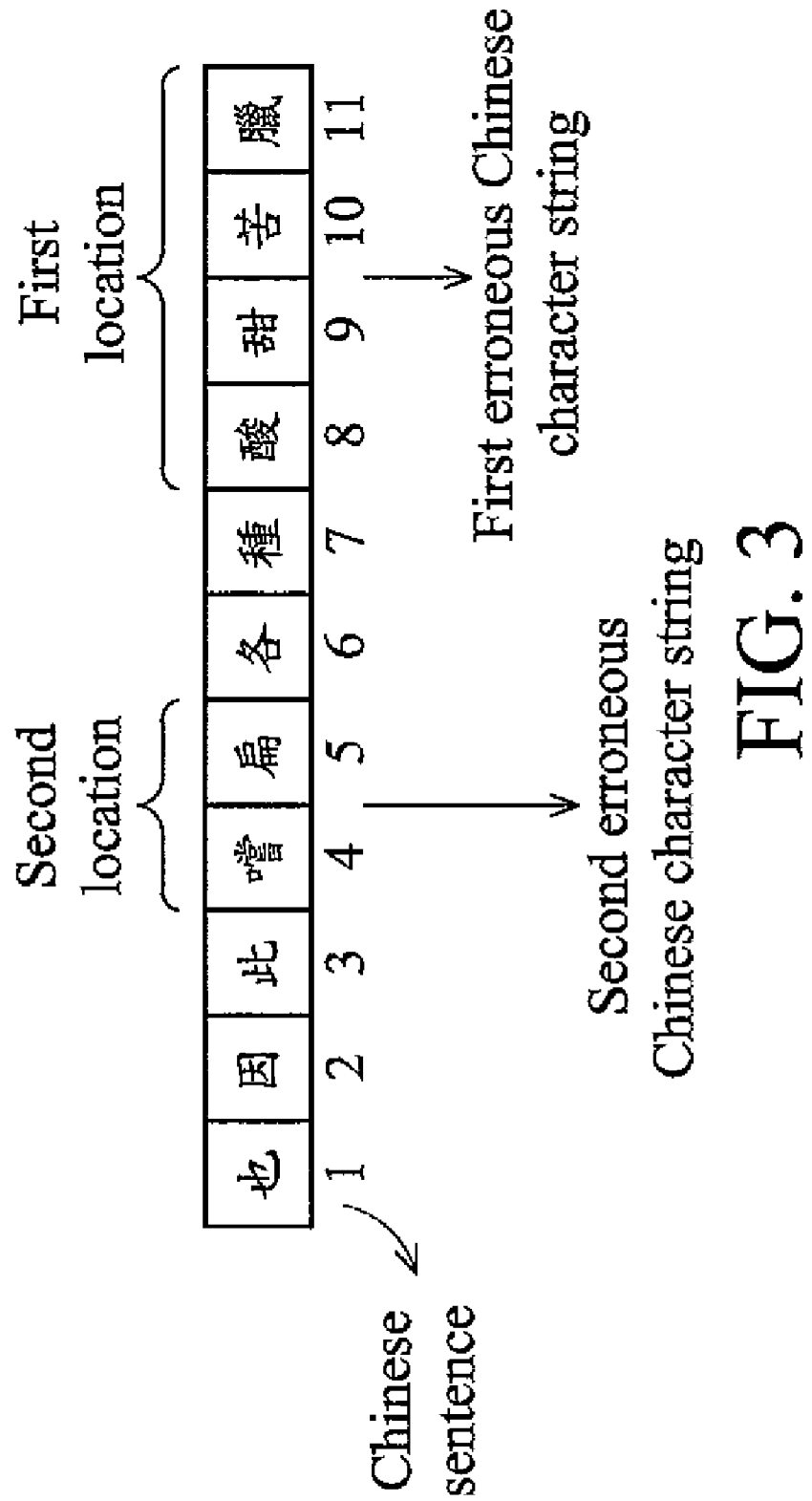
FIG. 3 depicts a structure of a Chinese article Art according to the invention.

Before the dividing procedure of an individual Chinese sentence is executed, there are some definitions that need to be clarified in advance. For example, with the Chinese sentence Str "也因此嚐扁各 種酸甜苦臘", the Chinese sentence Str comprises a first erroneous Chinese character string "酸甜苦臘" in a first location and a second erroneous Chinese character string "嚐扁" in a second location. The first location represents the location from the $8^{th}$ to $11^{th}$ Chinese character in the Chinese sentence Str, and the second location represents the location from the $4^{th}$ to $5^{th}$ Chinese character in the Chinese sentence Str, as shown in FIG. 3.

In this embodiment, the article-dividing module 120 subdivides the Chinese sentence Str into a plurality of first subgroups in a skipping bi-gram manner, wherein each of the first subgroups consists of any two consecutive and non-consecutive Chinese characters out of the Chinese sentence Str. In the case where each first subgroup consists of any two consecutive Chinese characters out of the Chinese sentence Str, the first subgroups may be represented by the following sets of characters: 12, 23, 34 and so on. The "12" here is the first subgroup consisting of the $1^{st}$ and $2^{nd}$ Chinese characters out of the Chinese sentence Str. Similarly, "23" is the first subgroup consisting of the $2^{nd}$ and $3^{rd}$ Chinese characters out of the Chinese sentence Str. On the other hand, in the case where each first subgroup consists of any two non-consecutive Chinese characters out of the Chinese sentence Str, the first subgroups may be represented by the following sets of characters: 13, 35, 57 and so on, and 24, 46, 68 and so on. The "13" here is the first subgroup consisting of the $1^{st}$ and $3^{rd}$ Chinese characters out of the Chinese sentence Str. Similarly, the "35" is the first subgroup consisting of the $3^{rd}$ and $5^{th}$ Chinese characters out of the Chinese sentence Str. This means that there is one Chinese character skipped (this is what's called the skipping bi-gram manner). In addition, in the case where each first subgroup consists of any two non-consecutive Chinese characters out of the Chinese sentence Str, the first subgroup may also be represented by the following sets of characters: 14, 47 and so on, 25, 58 and so on, and 36, 69 and so on. The "14" here is the first subgroup consisting of the $1^{st}$ and $4^{th}$ Chinese characters out of the Chinese sentence Str. Similarly, the "47" is the first subgroup consisting of the $4^{th}$ and $7^{th}$ Chinese characters out of the Chinese sentence Str. This means that there are two Chinese characters skipped while selecting two Chinese characters forming the first subgroup.

In conclusion of above description, the Chinese sentence Str "也因此嚐扁各種 酸甜苦臘" can be subdivided as the following first subgroups:

TABLE 1

First subgroups of Chinese sentence Str

| N | First subgroups |
|---|---|
| 0 | 也因 因此 此嚐 嚐扁 扁各 各種 種酸 酸甜 甜苦 苦臘 |
| 1 | 也此 此扁 扁種 種甜 甜臘 因嚐 嚐各 各酸 酸苦 |
| 2 | 也嚐 嚐種 種苦因扁 扁酸 酸臘 此各 各甜 |

Wherein N represents the number of skipped Chinese characters when selecting two Chinese characters forming the first subgroup. N equals 0 represents no skipped Chinese character between the two selected Chinese characters when selecting them out of the Chinese sentence Str. Similarly, N equals 1 represents one skipped Chinese character between the two selected Chinese characters when selecting them out of the Chinese sentence Str.

After the dividing procedure in step S110 is done, the next procedure in step S120 is to provide the correct language database 130 and the erroneous language database 140. It is noted that in step S120 there may also be only one provided database comprising the related data as stored in the correct language database 130 and the erroneous language database 140. Therefore, the two databases 130 and 140 are only used as a non-limiting example.

As described above, the correct language database 130 comprises a plurality of first correct Chinese character strings and a plurality of corresponding first correct indices. Similar to the first subgroups, the first correct indices are obtained by subdividing the first correct Chinese character strings using the previously described bi-gram mechanism mentioned previously. For example, assume that the correct language database 130 comprises two first correct Chinese character strings such as an idiom of "酸甜苦辣" and proper noun of "乙太網路", then the data stored in the correct language database 130 can be seen as follows:

TABLE 2

Data format of correct language database 130

| first correct indices | first correct Chinese character strings |
|---|---|
| 酸甜 甜苦 苦辣 酸苦 甜辣 酸辣 | 酸甜苦辣 |
| 乙太 太網 網路乙網 太路 乙路 | 乙太網路 |

In step S130, the candidate term generation module 150 acquires one of the first correct indices according to the first subgroups, and one of the first correct Chinese character strings according to the acquired first correct index. More specifically, the candidate term generation module 150 searches in the Table 2 for any first correct index that is the same as any first subgroup shown in Table 1. If there is a match, the candidate term generation module 150 acquires the proper first correct index, and further acquires a proper first correct Chinese character string according to the acquired first correct index. For example, the candidate term generation module 150 first searches in the Table 2 for any first correct index that is the same as the first subgroup of "也因" (refer to Table 1). Because there is no such match in Table 2, so the candidate term generation module 150 keeps searching in the Table 2 for any first correct index that is the same as the next first subgroup of "因此". Similarly, because there is no such match in Table 2, so the candidate term generation module 150 keeps searching in the Table 2 for any first correct index that is the same as the next first subgroup of "此嚐". The searching action is repeated until all of the first subgroups in Table 1 are searched. In the meanwhile, when searching the first subgroup of "酸甜", the candidate term generation module 150 finds a first correct index of "酸甜" in Table 2, so that the candidate term generation module 150 may acquire that first correct index (酸甜). Afterwards, the candidate term generation module 150 further acquires the corresponding first correct Chinese character string, namely the "酸甜苦辣". Similarly, when searching the first subgroup of "酸苦", the candidate term generation module 150 also finds a first correct index of "酸苦" in Table 2, thus further acquiring the first correct Chinese character string of "酸甜苦辣".

After the first correct Chinese character string "酸甜苦辣" is acquired, the next procedure in step S140 is to filter out the acquired first correct Chinese character string according to the Chinese character similarity between the first erroneous Chinese character string and the acquired first correct Chinese character string, and then set the filtered first correct Chinese character string as a first candidate term. The similarity of Chinese characters is dependent upon how many Chinese characters out of the acquired first correct Chinese character string appear in the Chinese sentence Str. The similarity value has to be higher than a predetermined threshold value (empirical threshold of representation) so that a certain confidence index is guaranteed. For the above example, there are three Chinese characters "酸甜苦" out of the acquired four-Chinese character first correct Chinese character string "酸甜苦辣", which appear in the Chinese sentence Str "也因此嚐扁各種 酸甜苦臘", wherein only the Chinese character "辣" does not. Therefore, the similarity value is determined to be 75% (3 Chinese characters out of 4). With the predetermined threshold value being 60% (non-limiting), the acquired first correct Chinese character string is filtered out since its similarity value is higher than the predetermined threshold value. Afterwards, the first correct Chinese character string "酸甜苦辣" that was filtered out is further set as a first candidate term, wherein the first candidate term corresponds to the first erroneous Chinese character string and the first location seen in FIG. 3. The first candidate term is further used to generate a best candidate sentence, the details of which will be explained later in the specification.

What has been described above is the processing of the first erroneous Chinese character string "酸甜苦臘", and in the following, the processing of the second erroneous Chinese character string "嚐扁" will be described.

As described above, the erroneous language database 140 comprises a plurality of second erroneous indices and a plurality of corresponding second correct Chinese character strings. In this case, assume that there are five second erroneous indices and two second correct Chinese character strings (only as an example) stored in the erroneous language database 140, the data format in the erroneous language database 140 can be seen as follows:

TABLE 3

Data format of erroneous language database 140

| Second erroneous indices | second correct Chinese character strings |
|---|---|
| 嚐扁 嚐片 嚐遍 | 嚐遍 |
| 棕子 綜子 | 粽子 |

Wherein the five second erroneous indices are the wrong phraseology that users often misuse, and the two second correct Chinese character strings are their corresponding correct phraseology. For example, in the Table 3, the second correct Chinese character string "粽子" is a correct phraseology for the wrong phraseology "棕子" and "綜子" that users often misuse. The confusion is caused by the character-similarity between the correct phraseology "粽子" and the wrong phraseology "棕子" or "綜子" (with all partially comprising "宗" as a part of the Chinese character). Similarly, users might often miswrite "嚐遍" as "嚐扁" (due to character-similarity) or "嚐片" (due to pronunciation-similarity as "遍" and "片" pronounced identically). To consider this, the invention pre-stores the often-misused phraseology "嚐扁" and "嚐片" as the second erroneous indices in the erroneous language database 140, and further pre-stores their corresponding correct phraseology "嚐" in the erroneous language database 140.

After the description of the erroneous language database 140 data format, the procedure next proceeds to step S150.

In the step S150, the candidate term generation module 150 generates a second candidate term according to the second erroneous indices. For the process, the candidate term generation module 150 determines whether the second erroneous Chinese character string is the same as any one of the second erroneous indices. If so, the candidate term generation module 150 first acquires the second erroneous index that is the same as the second erroneous Chinese character string, then acquires one of the second correct Chinese character strings according to the acquired second erroneous index, and finally sets the acquired second correct Chinese character string as a second candidate term. More specifically, with the above example, the candidate term generation module 150 first determines whether the first subgroup "也因" is the same as any one of the second erroneous indices shown in Table 3. Because there is no such match in Table 3, the candidate term generation module 150 moves to the next first subgroup "因此", determining whether there is any second erroneous index that is the same as the next first subgroup "因此". Similarly, because there is also no such match, the candidate term generation module 150 keeps trying the next first subgroup "此嚐" until all first subgroups are finished. In the meanwhile, when searching the first subgroup "嚐扁", the candidate term generation module 150 finds a second erroneous index "嚐扁" in Table 3. Next, the candidate term generation module 150 acquires the second erroneous index "嚐扁", then acquires the corresponding second correct Chinese character string "嚐遍", and finally sets the acquired second correct Chinese character string "嚐遍" as a second candidate term. Wherein, the second candidate term corresponds to the second erroneous Chinese character string and the second location shown in FIG. 3.

After the generation of the second candidate term, the first and second candidate terms are available, and the next procedure is to process them in step S160.

In step S160, the candidate sentence generating and scoring module 160 generates a plurality of candidate sentences in all possible combinations by replacing the first location and the second location of the Chinese sentence with the first erroneous Chinese character string, the second erroneous Chinese character string, the first candidate term and the second candidate term, according to their corresponding locations. Then, the candidate sentence generating and scoring module 160 scores the candidate sentences according to a candidate-sentence scoring mechanism, and the highest scored candidate sentence is set as a best candidate sentence.

FIG. 4 depicts all possible candidate sentence combinations for the Chinese sentence Str. As shown in FIG. 4, the candidate sentence generating and scoring module 160 uses the first erroneous Chinese character string, the second erroneous Chinese character string, the first candidate term and the second candidate term to generate four candidate sentences as follows: (A) 也因此嚐扁各 種酸甜苦臘", (B) 也因此嚐扁各 也因此嚐扁各 (C) 也因此嚐扁各 種酸甜苦臘 and (D) 也因此嚐扁各 種酸甜苦辣".

Figure 5:
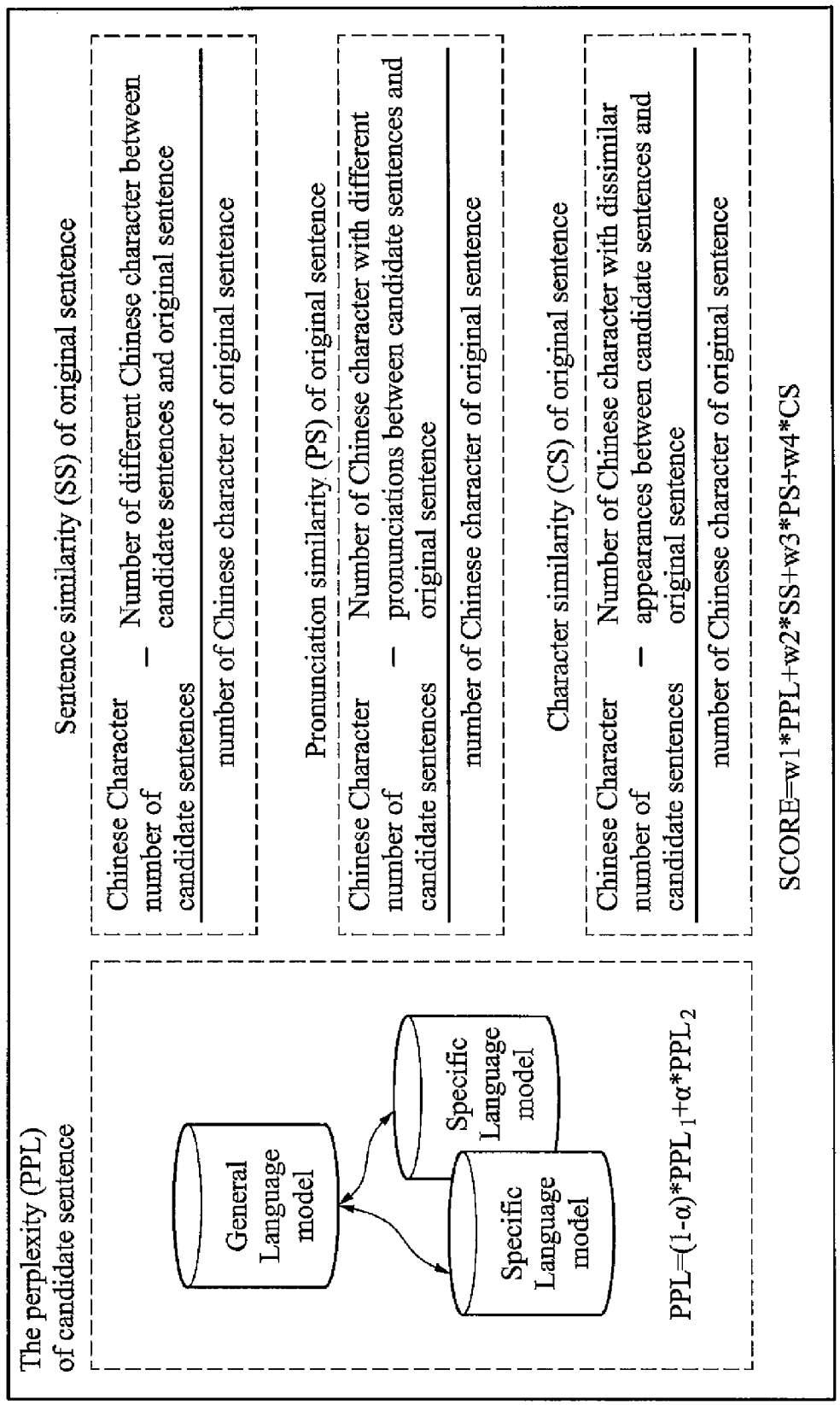
FIG. 5 depicts a diagram of a candidate-sentence scoring mechanism of an embodiment according to the invention.

FIG. 5 depicts a diagram of a candidate-sentence scoring mechanism of an embodiment according to the invention. With four candidate sentences generated above, the candidate sentence generating and scoring module 160 scores the candidate sentences according to the following four factors: (1) perplexity (short as PPL hereinafter) of candidate sentences, (2) the sentence similarity (short as SS hereinafter) between the Chinese sentence Str (namely, the original sentence) and candidate sentences, (3) the pronunciation similarity (short as PS hereinafter) between the Chinese sentence Str and candidate sentences, and (4) the Chinese character similarity (CS) between the Chinese sentence Str and candidate sentences. Wherein, the PPL represents the language model for a specific field of knowledge, such as medicine, astronomy or science and so on, for example. With PPL, the candidate sentence generating and scoring module 160 can score each candidate sentence according to at least a specific field of knowledge specified by users. For example, if the Chinese article is related to the astronomical field, then the PPL can be set to the astronomical language model so that each candidate sentence is scored based on the astronomical phraseology. On the other hand, the sentence similarity between the original sentence and candidate sentences is defined as: (A−B)/C. Wherein, A represents the Chinese character number of candidate sentences, B represents the number of different Chinese characters between the candidate sentences and original sentence, C represents the number of Chinese character of the original sentence. In addition, the pronunciation similarity between the original sentence and candidate sentences is defined as: (A−B)/C. Wherein, A represents the Chinese character number of candidate sentences, B represents the number of Chinese characters with different pronunciations between the candidate sentences and the original sentence, C represents the number of Chinese character of the original sentence. In addition, the Chinese character similarity between the original sentence and each candidate sentence is defined as: (A−B)/C. Wherein, A represents the Chinese character number of candidate sentences, B represents the number of Chinese characters with dissimilar appearances between the candidate sentences and original sentence, C represents the number of Chinese character of the original sentence. In conclusion of the above description, each candidate sentence is individually given a score according to the above four factors, and the formula for scoring is expressed as:

$$SCORE = w1*PPL + w2*SS + w3*PS + w4*CS$$

Wherein, w1 represents the weight for PPL, w2 for SS, w3 for PS, and w4 for WS. The w1, w2, w3 and w4 are designated by users based on requirements. And also, the PPL of candidate sentences can include one or more language models (field of knowledge), so that the PPL can be calculated with the following formula:

$$PPL = (1-\alpha)*PPL_1 + \alpha*PPL_2$$

Wherein $PPL_1$ is the first language model, $PPL_2$ is the second language model, and $\alpha$ is chosen by users.

With the above formula, the parameters given in an experiment are as follows:

$$\alpha = 0.6, w1 = -0.0001, w2 = 1, w3 = 1, w4 = 1$$

As a result, the sentence (D) 也因此嚐扁各 種酸甜苦辣" in FIG. 4 gets the highest score, so it is set as a best candidate sentence by the candidate sentence generating and scoring module 160.

Finally, in step S170, the article-remarking module 200 remarks the modification between the best candidate sentence and the original sentence on the display device 210.

Above is the detailed description of the invention, it is noted that the flowchart described above can vary without departing from the scope of the invention. For example, the first candidate term does not necessarily have to be generated prior to the generation of second candidate term. Therefore, the first candidate term may be generated after the generation of second candidate term, or at the same time with the second candidate term.

Furthermore, in the above embodiment, the second erroneous Chinese character string comprises only two Chinese characters "嚐扁". However, it may comprise more characters. For example, the second erroneous Chinese character string may be "想著美 "想用著美 In this case, the Chinese character string "想用" becomes a wrong way of expressing the idea, even though it is a right usage. This is because the Chinese character string "想用" appears in the Chinese character string with another Chinese character string "佳餚", which it doesn't usually coexist with. What causes the mistake is the pronunciation similarity between "享" and "想", therefore, making it easier to use the wrong Chinese character with correct pronunciation. For this problem, the solutions will be provided in the following embodiment.

In this embodiment, considering the above Table 3 with a new element added, as shown in Table 4 below:

TABLE 4

Data format of erroneous language database 140

| Second erroneous indices | second correct Chinese character strings | contexts |
|---|---|---|
| 嗜扁 嗜偏 薔遍 | 嗜遍 | |
| 棕子 綜子 | 粽子 | |
| 佳佳 | 家家 | 戶戶 |
| 想用 | 享用 | 佳餚 |

Table 4 shows the data format of the erroneous language database 140, wherein the first and second rows are the original contents as indicated in Table 3 and the third and fourth rows are the newly-added contents in this embodiment. In this regard, the erroneous language database 140 further comprises a plurality of corresponding contexts, as shown in the third and fourth rows. However, one skilled in the art should appreciate that the above Table is only an example, and it should not be regarded as a limitation of the invention.

In the above Table 3, with the second erroneous Chinese character string being "嗜扁" or "綜子"), the corresponding correct Chinese character string "嗜遍" (or "粽子" can be found immediately since they are wrong phraseologies themselves. But with the second erroneous Chinese character string being "佳佳" or "想用", the corresponding correct Chinese character string can not be originally found. This is because they are not wrong phraseologies themselves, but only wrong phraseologies due to certain Chinese character strings appearing together with them. Therefore, these certain Chinese character strings are defined as contexts (as shown in third column in Table 4) in this embodiment, and stored in the erroneous language database 140. The following will aim at providing a more detailed description.

With the Chinese sentence "想用著美味 的佳餚", the Chinese sentence has an erroneous Chinese character string "想用". First, the Chinese sentence is also subdivided into a plurality of Chinese character subgroups in a bi-gram manner. The procedure is similar with that of Table 1, so it is not described here again for brevity. In the following procedure, the candidate term generation module 150 determines whether the Chinese character subgroup "想用" is the same as any one of the second erroneous indices shown in Table 4. Because there is a match in Table 4, the candidate term generation module 150 acquires the second erroneous index "想用" that is the same as the second erroneous Chinese character string, acquires the context "佳餚" corresponding to the acquired second erroneous index, and finally determines whether the Chinese sentence comprises the acquired context "佳餚". If the Chinese sentence does comprises the acquired context "佳餚", it means that "想用" is indeed a wrong phraseology. If the Chinese sentence does not comprise the acquired context "佳餚", it means that "想用" is a correct phraseology, thereby processing the next Chinese character subgroup "用著" until all of the Chinese character subgroups are finished. In this case, because the Chinese sentence does comprises "佳餚", the candidate term generation module 150 acquires the second correct Chinese character string "享用" corresponding to the acquired context "佳餚", and sets the acquired second correct Chinese character string "享用" as a second candidate term.

In this embodiment, there is only one candidate term generated since there is only one erroneous Chinese character string (想用 appearing in the Chinese sentence 想 用著美味的佳餚 That is, the second candidate term is the only candidate term. In addition, one skilled in the art should appreciate that there would be an N amount of candidate terms generated if there are N erroneous Chinese character strings appear in a Chinese sentence, and these N erroneous Chinese character strings will lead to the generation of $2^N$ candidate sentences (including the original sentence) with all possible combinations.

In addition, the error-detecting method for Chinese articles can be recorded as a program in a storage medium for performing the above procedures, such as an optical disk, floppy disk and portable hard drive and so on. It is to be emphasized that the program of the error-detecting method is formed by a plurality of program codes corresponding to the procedures described above.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An error-detecting method for a Chinese article, applied in a computer system, applicable for handling a Chinese sentence comprising a first erroneous Chinese character string in a first location, comprising:
using a processor of the computer system to execute the following steps of:
subdividing the first erroneous Chinese character string into a plurality of first subgroups, wherein each of the first subgroups consists of two consecutive or non-consecutive Chinese characters out of the first erroneous Chinese character string, wherein the Chinese sentence further comprises a second erroneous Chinese character string in a second location;
providing a database comprising a plurality of first correct Chinese character strings and a plurality of corresponding first correct indices, wherein the first correct indices consist of two consecutive and non-consecutive Chinese characters out of the first correct Chinese character strings, wherein the database further comprises a plurality of second erroneous indices and a plurality of corresponding second correct Chinese character strings;
acquiring one of the first correct indices according to the first subgroups, and one of the first correct Chinese character strings according to the acquired first correct index;
generating a best candidate sentence according to the acquired first correct Chinese character string;
setting the acquired first correct Chinese character string as a first candidate term and generating as second candidate term according to the second erroneous indices;
determining whether the second erroneous Chinese character string is the same as one of the second erroneous indices; and
showing the Chinese sentence and the best candidate sentence on a display device.

2. The error-detecting method for a Chinese article as claimed in claim 1, the best candidate sentence is generated by replacing the first erroneous Chinese character string of the Chinese sentence with the acquired first correct Chinese character string.

3. The error-detecting method for a Chinese article as claimed in claim 1, further comprising:
  acquiring the second erroneous index that is the same as the second erroneous Chinese character string, and one of the second correct Chinese character strings according to the acquired second erroneous index; and
  setting the acquired second correct Chinese character string as the second candidate term.

4. The error-detecting method for a Chinese article as claimed in claim 3, further comprising generating a plurality of candidate sentences by replacing the first location and the second location of the Chinese sentence with the first erroneous Chinese character string, the second erroneous Chinese character string, the first candidate term and the second candidate term.

5. The error-detecting method for a Chinese article as claimed in claim 4, further comprising generating the best candidate sentence by scoring the candidate sentences according to a candidate-sentence scoring mechanism.

6. The error-detecting method for a Chinese article as claimed in claim 5, wherein the candidate-sentence scoring mechanism scores the candidate sentences according to the following four factors:
  at least one language model;
  sentence similarity between the Chinese sentence and the candidate sentences;
  pronunciation similarity between the Chinese sentence and the candidate sentences; and Chinese character similarity between the Chinese sentence and the candidate sentences.

7. The error-detecting method for a Chinese article as claimed in claim 1, wherein the database further comprises a plurality of contexts.

8. The error-detecting method for a Chinese article as claimed in claim 7, further comprising:
  acquiring the second erroneous index that is the same as the second erroneous Chinese character string, and one of the contexts according to the acquired second erroneous index; and
  determining whether the Chinese sentence comprises the acquired context.

9. The error-detecting method for a Chinese article as claimed in claim 8, further comprising:
  acquiring one of the second correct Chinese character strings when the Chinese sentence comprises the acquired context; and
  setting the acquired second correct Chinese character string as the second candidate term.

10. An error-detecting apparatus for a Chinese article, applicable for handling a Chinese sentence comprising a first erroneous Chinese character string in a first location, comprising:
  an article-dividing module subdividing the first erroneous Chinese character string into a plurality of first subgroups, wherein each of the first subgroups consists of two consecutive or non-consecutive Chinese characters out of the first erroneous Chinese character string, wherein the Chinese sentence further comprises a second erroneous Chinese character string in a second location;
  a database comprising a plurality of first correct Chinese character strings and a plurality of corresponding first correct indices, wherein the first correct indices consist of two consecutive and non-consecutive Chinese characters out of the first correct Chinese character strings, wherein the database further comprises a plurality of second erroneous indices and a plurality of corresponding second correct Chinese character strings;
  a candidate term generation module acquiring one of the first correct indices according to the first subgroups, and one of the first correct Chinese character strings according to the acquired first correct index, wherein the candidate term generation module further sets the acquired first correct Chinese character string as a first candidate term and generates a second candidate term according to the second erroneous indices;
  a candidate sentence generating and scoring module generating a best candidate sentence according to the acquired first correct Chinese character string, wherein the candidate term generation module further determines whether the second erroneous Chinese character string is the same as one of the second erroneous indices; and
  a display device showing the Chinese sentence and the best candidate sentence.

11. The error-detecting apparatus for a Chinese article as claimed in claim 10, wherein the best candidate sentence is generated by replacing the first erroneous Chinese character string of the Chinese sentence with the acquired first correct Chinese character string.

12. The error-detecting apparatus for a Chinese article as claimed in claim 10, wherein the candidate term generation module further performs the following procedures:
  acquiring the second erroneous index that is the same as the second erroneous Chinese character string, and one of the second correct Chinese character strings according to the acquired second erroneous index; and
  setting the acquired second correct Chinese character string as the second candidate term.

13. The error-detecting apparatus for a Chinese article as claimed in claim 12, wherein the candidate sentence generating and scoring module further generates a plurality of candidate sentences by replacing the first location and the second location of the Chinese sentence with the first erroneous Chinese character string, the second erroneous Chinese character string, the first candidate term and the second candidate term.

14. The error-detecting apparatus for a Chinese article as claimed in claim 13, wherein the candidate sentence generating and scoring, module further generates the best candidate sentence by scoring the candidate sentences according to a candidate-sentence scoring mechanism.

15. The error-detecting apparatus for a Chinese article as claimed in claim 14, wherein the candidate-sentence scoring mechanism scores the candidate sentences according to the following four factors:
  at least one language model;
  sentence similarity between the Chinese sentence and the candidate sentences;
  pronunciation similarity between the Chinese sentence and the candidate sentences; and Chinese character similarity between the Chinese sentence and the candidate sentences.

16. The error-detecting apparatus for a Chinese article as claimed in claim 10, wherein the database further comprises a plurality of contexts.

17. The error-detecting apparatus for a Chinese article as claimed in claim 16, wherein the candidate term generation module further performs the following procedures:
  acquiring the second erroneous index that is the same as the second erroneous Chinese character string, and one of the contexts according to the acquired second erroneous index; and determining whether the Chinese sentence comprises the acquired context.

18. The error-detecting apparatus for a Chinese article as claimed in claim 17, wherein the candidate term generation module further performs the following procedures:
   acquiring one of the second correct Chinese character strings when the Chinese sentence comprises the acquired context; and
   setting the acquired second correct Chinese character string as the second candidate term.

19. A non-transitory storage medium for storing an error-detecting program for a Chinese article, wherein the error-detecting program comprises a plurality of program codes to be loaded onto a computer system so that an error-detecting method for the Chinese article is executed by the computer system, and the error-detecting method is applicable for handling a Chinese sentence comprising a first erroneous Chinese character string in a first location, comprising:
   using a processor of the computer system to execute the following steps of:
      subdividing the first erroneous Chinese character string into a plurality of first subgroups, wherein each of the first subgroups consists of two consecutive or non-consecutive Chinese characters out of the first erroneous Chinese character string, wherein the Chinese sentence further comprises a second erroneous Chinese character string in a second location;
   providing a database comprising a plurality of first correct Chinese character strings and a plurality of corresponding first correct indices, wherein the first correct indices consist of two consecutive and non-consecutive Chinese characters out of the first correct Chinese character strings, wherein the database further comprises a plurality of second erroneous indices and a plurality of corresponding second correct Chinese character strings;
   acquiring one of the first correct indices according to the first subgroups, and one of the first correct Chinese character strings according to the acquired first correct index;
   generating a best candidate sentence according to the acquired first correct Chinese character string;
   setting the acquired first correct Chinese character string as a first candidate term and generating a second candidate term according to the second erroneous indices;
   determining whether the second erroneous Chinese character string is the same as one of the second erroneous indices; and
   showing the Chinese sentence and the best candidate sentence on a display device.

* * * * *